(153.)
HENRY S. GILLETTE.
Machine for Sawing Marble Diagonally.
No. 121,773. Patented Dec. 12, 1871.
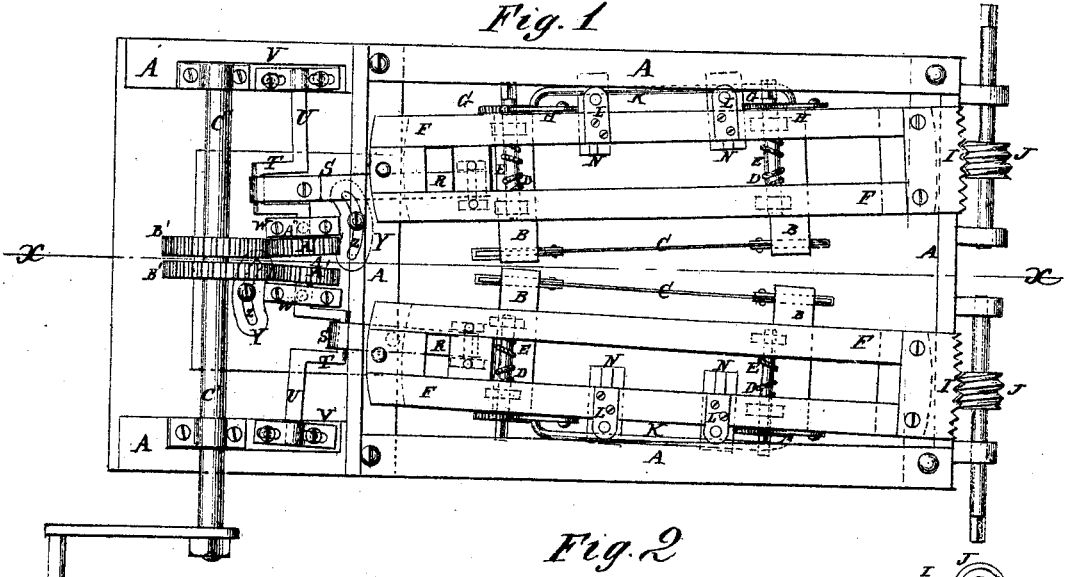
Fig. 1
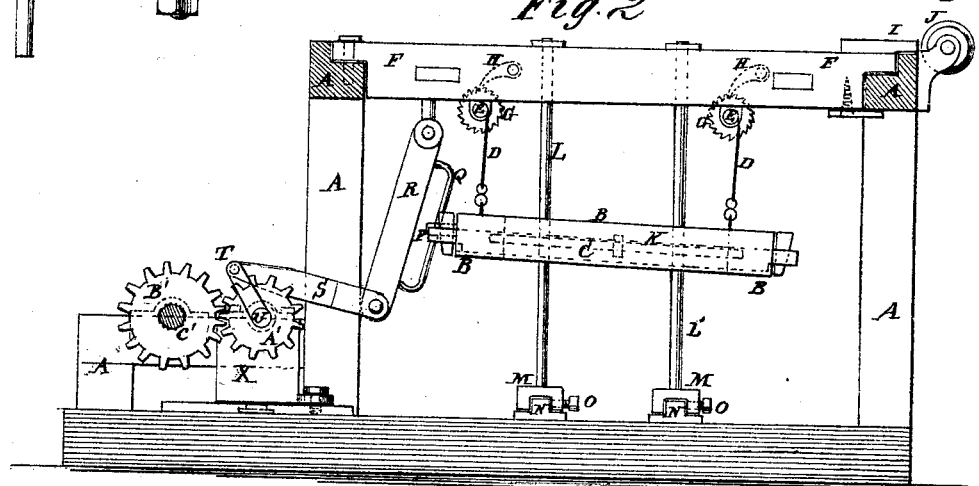
Fig. 2
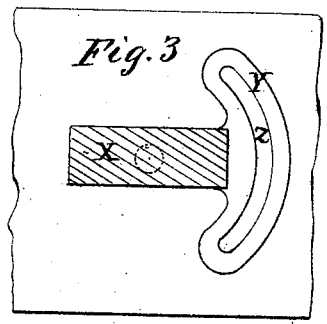
Fig. 3
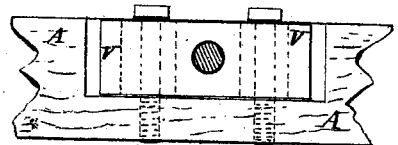
Fig. 4
Fig. 5
Witnesses:
A. W. Almqvist
Alex F. Roberts
Inventor:
Henry S. Gillette
Per Munn & Co
Attorneys.

UNITED STATES PATENT OFFICE.

HENRY S. GILLETTE, OF NEW PRESTON, CONNECTICUT.

IMPROVEMENT IN MACHINES FOR SAWING STONE.

Specification forming part of Letters Patent No. 121,773, dated December 12, 1871.

*To all whom it may concern:*

Be it known that I, HENRY S. GILLETTE, of New Preston, in the county of Litchfield and State of Connecticut, have invented a new and useful Improvement in Machines for Sawing Marble Diagonally; and I do hereby declare that the following is a full, clear, and exact description thereof, which will enable others skilled in the art to make and use the same, reference being had to the accompanying drawing forming part of this specification.

Figure 1 is a top view of my improved machine. Fig. 2 is a detail vertical section of the same taken through the line $xx$, Fig. 1. Fig. 3 is a detail sectional view illustrating the device for adjusting the crank-shaft bearings. Fig. 4 is a detail side view of the adjustable bearings for the outer ends of the crank-shafts. Fig. 5 is a detail view of the adjustable support for the lower end of the guide-rods.

My invention is an improvement in the class of marble or stone-sawing machines which are adopted to saw two sides of a block at the same time, and upon divergent or parallel diagonal lines. The invention relates particularly to an improved arrangement of the bearings of the pinions or spur-gears and their shafts, as hereinafter described.

A represents the frame-work that supports the operating mechanism of the machine, and which may be, in whole or in part, the frame of the building. B are the saw-frames, to each of which one or more saws, C, may be attached in the ordinary manner. The saw-frames B are raised and lowered to feed the saws to their work by ropes or chains D attached to the said frames B, and attached to and wound around shafts E pivoted to the frames F, and provided with ratchet-wheels G and pawls H to hold them in any position to which they have been adjusted. The frames F are supported at their ends by the frame-work A, and are pivoted at their forward ends to said frame-work A. The rear ends of the frames F slide laterally upon their supports, and have racks I attached to them, into the teeth of which mesh the threads of the endless screws J, which are swiveled to the frame A, and are operated by cranks or other well-known mechanical devices. Other devices may be used for adjusting the ends of the frames F, provided that they will enable said frames to be moved steadily, stopped at any desired point, and held firmly in place when adjusted. To the outer sides of the saw-frames B are attached long keepers, K, through which pass vertically guide-rods L, the upper ends of which are supported by brackets or arms attached to the frames F, or are attached directly to said frames. The the lower ends of the guide-rods enter blocks M, which are grooved upon their lower sides to receive the flanges, rails, or ways N, which are attached to the floor or bed of the machine, and to which said grooved blocks M are secured by hand-screws O, as shown in Figs. 2 and 3. This construction allows the lower ends of the guide-rods L to be conveniently adjusted to correspond with the adjustment of the upper ends of said rods L and of the frames F. To the forward ends of the saw-frames B are attached hooks P, which hook into long keepers Q, attached to the swinging beams R, the upper ends of which are pivoted to the forward part of the adjustable frames F. To the lower ends of the swinging beams R are pivoted the rear ends of the pitmen S, the forward ends of which are pivoted to the cranks T of the crank-shafts U. As it is necessary that the saws should move forward and backward in exactly the same line, the movements of the swinging beams R, pitmen S, and cranks T must be in the same line. This renders it necessary that the bearings of the crank-shafts U should be adjustable, so that the line of the said shafts may always be at right angles with the line of movement of the saws. V are the bearings for the outer ends of the crank-shafts U, which bearings are secured to the frame-work A by screws or bolts passing through slots in the said bearings V. W are the bearings for the inner ends or journals of the shafts U, which bearings are formed in or attached to the upper ends of the standards X, the lower ends of which are pivoted to the floor or bed of the machine. Upon the lower ends of the standards X are formed flanges Y, having a curved slot, Z, formed in them, through which passes a screw or bolt, so that the said standards and the bearings attached to them can be firmly secured in place when adjusted, and may be easily adjusted when desired. To the inner ends of the crank-shafts U are attached small gear-wheels A', the teeth of which mesh into the teeth of the larger gear-wheels B' attached to the driving-shaft C', which may be driven by any convenient power.

By this construction each of the saw-frames may be adjusted entirely independent of the other, so that the opposite sides of the block of marble may be sawn upon the same inclination or upon different inclinations, or one side may be sawn inclined and the other straight, as may be desired.

I do not claim the use of pivoted saw-frames made laterally adjustable by endless screws and racks; but

Having thus described my invention, what I claim is—

In combination with the crank-shafts T U and gears A' A', the adjustable slotted bearings V, bearings W, and standards X provided with slotted flanges Y, all arranged as herein shown and described, for the purpose specified.

Witnesses:     HENRY S. GILLETTE.
WATSON COGSWELL,
EDWIN H. BEARDSLEY.    (153)